United States Patent

[11] 3,587,632

| [72] | Inventor | Haile S. Clay<br>Los Altos Hills, Calif. |
|---|---|---|
| [21] | Appl. No. | 863,759 |
| [22] | Filed | Oct. 1, 1969 |
| [45] | Patented | June 28, 1971 |
| [73] | Assignee | The United States of America as represented by the United States Atomic Energy Commission |

[54] OVERPRESSURE RELIEF VALVE HAVING A FAIL-SAFE RELEASABLE VALVE STEM GUIDE
6 Claims, 1 Drawing Fig.

[52] U.S. Cl. .................................................. 137/543,
137/516.29, 137/556
[51] Int. Cl. ................................................... F16k 15/06
[50] Field of Search........................................137/516.25,
516.27, 516.29, 540, 542, 543, 467

[56] References Cited
UNITED STATES PATENTS

| 1,891,119 | 12/1932 | Stover............................ | 137/542X |
| 2,912,000 | 11/1959 | Green............................ | 137/516.29X |
| 3,053,501 | 9/1962 | Varga............................ | 137/516.29X |
| 3,200,839 | 8/1965 | Gallagher....................... | 137/516.29 |

Primary Examiner—William F. O'Dea
Assistant Examiner—David J. Zobkiw
Attorney—Roland A. Anderson ABSTRACT: A spring-loaded valve head normally operable to be moved under differential pressure away from a seat. A stem extending from the head is guided in a sleeve that is mounted in the valve housing by means of an O-ring that is force fitted between the sleeve and housing in opposing grooves in the sleeve and housing. The guide, therefore, is releasable from the housing to permit valve head movement away from the seat in the event that the stem becomes bound in the sleeve during an overpressure.

PRESSURE VESSEL

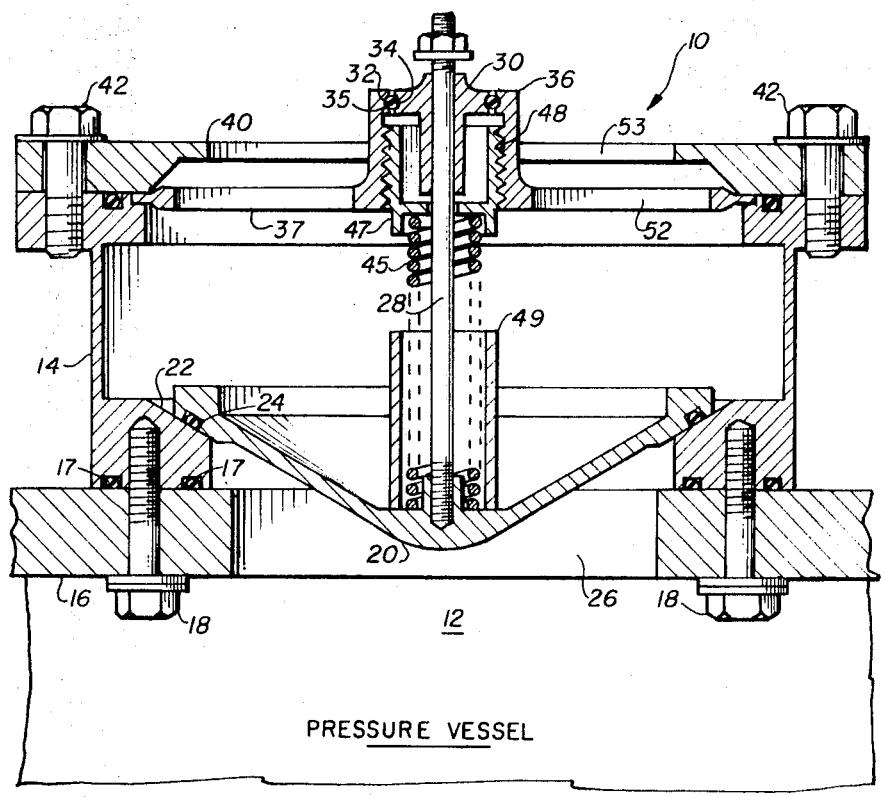
PRESSURE VESSEL
INVENTOR.
HAILE S. CLAY
BY
ATTORNEY

OVERPRESSURE RELIEF VALVE HAVING A FAIL-SAFE RELEASABLE VALVE STEM GUIDE

BACKGROUND OF THE INVENTION

This invention relates to overpressure relief valves, and more particularly, it relates to an overpressure relief valve having a fail-safe releasable valve stem guide.

A common failure of overpressure relief valves is the sticking of the valve stem in its guide. A safeguard in addition to the relief valve is needed therefore to provide positive protection against overpressures. This is particularly important where an overpressure is a danger to personnel or expensive equipment. A common arrangement is to provide a second safety device, usually a bursting disc. However, there are disadvantages with such an arrangement. For example, once a disc fails, new parts are required before the disc can be replaced; two safety devices require two penetrations into the system to be protected, thereby requiring leak protection and surveillance in two locations; and bursting discs are easily damaged and therefore susceptible to rupture at pressures less than an overpressure.

SUMMARY OF THE INVENTION

In brief, the present invention results in a single valve assembly and housing that includes intermittent overpressure relief mechanism for intermittently relieving overpressures and then automatically resealing the system, and that further includes fail-safe mechanism for overpressure protection in the event that the intermittent mechanism fails to operate. The intermittent mechanism for overpressure relief comprises a spring loaded reciprocable valve head having a stem guided in a sleeve that is releasable from the valve housing in the event that the stem sticks in the sleeve during an overpressure. The guiding sleeve is not exposed to differential pressures and therefore it is not required that the sleeve be sealed in the pressure system. Thus, only one seal is required for the entire valve assembly. No additional sealing is required for the fail-safe protection feature of the invention. In the event that the guiding sleeve is forced from its normal position, the complete assembly may be easily and simply remounted in the system without new parts or specialized tools. This permits immediate reoperation of the system. In addition the assembly is susceptible of being made rugged without sacrifice of accuracy or reliability.

It is an object of the loosely to protect a pressure system from overpressures with a fail-safe overpressure relief valve.

Another object is to provide a pressure system with mechanism for intermittent overpressure relief and automatic resealing combined with additional relief in the event of failure of the intermittent mechanism.

Another object is to provide a pressure system with fail-safe overpressure relief by means of a single valve assembly.

Another object is to provide fail-safe overpressure relief for a pressure system with only a single penetration into the system.

Other objects and advantageous features of the invention will be apparent in a description of a specific embodiment thereof, given by way of example only, to enable one skilled in the art to readily practice the invention, and described hereinafter valve reference to the accompanying drawing.

BRIEF DESCRIPTION OF THE DRAWING

The FIGURE is a cross-sectional view of a fail-safe pressure relief valve having a releasable valve stem according to the invention.

DESCRIPTION OF AN EMBODIMENT

Referring to the drawing there is shown in the FIGURE a fail-safe pressure relief valve assembly 10 mounted on a pressure vessel 12. The valve assembly is comprised of a housing 14 secured to and sealed against a wall 16 of the pressure vessel 12 by means of O-rings 17 and bolts 18 that extend through the wall and into the housing. A valve head 20 normally is maintained seated in a seat 22 formed in the housing 14. A vacuum seal is maintained between the head and housing by means of an O-ring 24. A valve stem 28 is secured to the center of the head 20 and extends away from the head into sliding engagement with a guiding sleeve 30. The sleeve 30 is normally held stationary with respect to the housing 14 by means of a resilient O-ring 32 that is held in pressure engagement between the sleeve and a hub 36. The O-ring 32 is force fitted between an external annular groove 34 in the sleeve 30 and an opposing internal annular groove 35 in the hub 36. The hub 36 is the central part of a spider flange 37 that is held integral with the housing 14 by means of a retaining flange 40 and bolts 42.

The valve head 20 normally is maintained seated against the seat 22 of the housing 14 by means of a compression spring 45 coaxially mounted around the stem 28 and bearing against the head 20 at one end and against an adjustment nut 47 that is integral with the housing 14 at the other end. The adjustment nut 47 is in threaded engagement with the hub 36 to provide for adjustment of the spring force against the head 20. A nylon insert 48 is used to lock the adjustment nut with respect to the hub. A sleeve 49 is coaxially mounted around the spring 45 to limit upward of movement of the head 20 upon engagement of the sleeve 49 with the adjustment nut 47. The sleeve 49 also holds the spring 45 in a cylindrical form during compression of the spring.

In operation, the spring 45 normally holds the head 20 sealed against the housing 14 thereby preventing fluid flow from the pressure vessel 12. Upon the occurrence of an overpressure the head 20 is moved away from the seat 22 thereby permitting fluid flow through the opening 26 and an opening 52 in the spider flange 37 and an opening 53 in the flange 40 to a low pressure area. Upon relief of the overpressure, the head 20 is returned to its seated position against the seat 22 by the spring 45. The valve, therefore, is intermittently operable in the manner described. However, for various reasons, the valve stem 28 may become bound or stuck in the sleeve 30 to the extent that the valve head 20 is prevented from moving away from the seat 22 for relief of an overpressure. In such an event, the force due to the overpressure is transmitted from the head 20 to the stem 28 and hence to the sleeve 30; and since the sleeve 30 normally is held stationary with respect to the housing 14 by means of the O-ring 32 between the grooves 34 and 35, the sleeve 30 slips outwardly and away from the hub 36 to permit the head 20 to move away from the seat 22 and thereby relieve the overpressure in vessel 12. Since the head will not return to the seat 22 under such conditions, a drop in the pressure within the pressure vessel below normal activates controls to alert personnel of the condition and initiates a shutdown of the pressure system. The valve assembly 10, however, may be rapidly reassembled without necessity of obtaining spare parts. After the stem and sleeve are wiped clean, the O-ring 32 and sleeve 30 may be manually reassembled in their normal operating position. At most, the only spare part that may be required is the O-ring 32. Thus with the valve assembly 10 returned to its normal operating position, operation of the pressure system may be resumed almost immediately.

In a valve exemplifying the invention, the assembly was intermittently operated for relief of overpressures under differential pressures in the range of 0 to 1 p.s.i. and upon a deliberate binding of the valve stem in the guiding sleeve the assembly relieved an overpressure of approximately 12 p.s.i. The assembly was manually reassembled in a matter of minutes and operation of the pressure system was resumed.

While an embodiment of the invention has been shown and described, further embodiments or combinations of those described herein, will be apparent to those skilled in the art without departing from the spirit of the invention.

I claim:

1. A pressure relief valve assembly including mechanism that is normally operable to intermittently relieve differential fluid overpressures in a pressure system and then automatically reseal the system and further including additional mechanism that is operable to relieve an overpressure in the event of failure of the intermittently operated mechanism, said assembly comprising:
 a. a valve seat;
 b. a valve head sealable in said seat and subject to differential fluid pressures of said system;
 c. means for forcing said valve head into said seat in the presence of normal differential pressures in said system;
 d. a stem integral with said valve head;
 e. a mounting integral with said seat;
 f. a guide for said stem; and
 g. means for holding said guide in said mounting in a position that is remote from the location of any point of differential fluid pressure of said system, said holding means normally holding said guide to enable said guide to guide said stem during movement of said head into and out of said seat during normal intermittent operation, said guide being releasable from said holding means to permit movement of said valve head out of said seat upon said stem being bound in said guide during an overpressure.

2. The valve assembly of claim 1, wherein said guide is releasable from said mounting in the axial direction of said stem.

3. The valve assembly of claim 1 wherein said holding means is force fitted between said mounting and said guide.

4. The valve assembly of claim 3 wherein said holding means includes an annular external groove formed in said guide, an annular internal groove in said mounting that opposes said groove in said guide, and an O-ring that is force fitted between said grooves to releasably hold said guide to said mounting.

5. The valve assembly of claim 1 wherein said forcing means is a compression spring coaxially mounted around said stem for applying force between said head and mounting.

6. The valve assembly of claim 5 further including an adjustment nut having external threads and coaxially mounted around said stem, and internal threads in said mounting for receiving the threads of said nut, means in said nut for receiving one end of said spring for adjustment of the compressive force of said spring between said mounting and said head by rotation of said nut threads in said mounting threads.